US012583547B2

(12) United States Patent
Salviani et al.

(10) Patent No.: US 12,583,547 B2
(45) Date of Patent: Mar. 24, 2026

(54) METHOD AND SYSTEM FOR DETECTING THE SPEED OF A BICYCLE

(71) Applicant: RAICAM DRIVELINE S.R.L., Mondovi' (IT)

(72) Inventors: Matteo Salviani, Boves (IT); Benjamin Chetwood Struve', Kenilworth (GB); Andrea Canestrari, San Costanzo (IT)

(73) Assignee: RAICAM DRIVELINE S.R.L., Mondovi' (IT)

( * ) Notice: Subject to any disclaimer, the term of this patent is extended or adjusted under 35 U.S.C. 154(b) by 383 days.

(21) Appl. No.: 18/258,808

(22) PCT Filed: Dec. 17, 2021

(86) PCT No.: PCT/EP2021/086410
§ 371 (c)(1),
(2) Date: Jun. 21, 2023

(87) PCT Pub. No.: WO2022/136148
PCT Pub. Date: Jun. 30, 2022

(65) Prior Publication Data
US 2024/0043084 A1 Feb. 8, 2024

(30) Foreign Application Priority Data
Dec. 22, 2020 (IT) ........................ 102020000031865

(51) Int. Cl.
B62J 45/413 (2020.01)
B60T 8/17 (2006.01)
(Continued)

(52) U.S. Cl.
CPC ........... B62J 45/413 (2020.02); B60T 8/1706 (2013.01); B60T 8/172 (2013.01); B62J 45/412 (2020.02);
(Continued)

(58) Field of Classification Search
None
See application file for complete search history.

(56) References Cited

U.S. PATENT DOCUMENTS 6,062,660 A 5/2000 Matsuno
2011/0098903 A1 4/2011 Ogawa
(Continued)

FOREIGN PATENT DOCUMENTS

DE 10 2015 000931 A1 7/2016
EP 3321159 A1 * 5/2018 ............. B62K 19/38
JP 2020-011617 A 1/2020

OTHER PUBLICATIONS

EP-3321159-A1: English Machine Translation (Year: 2018).*
International Search Report and Written Opinion received for PCT Serial No. PCT/EP2021/086410 on Apr. 20, 2022, 13 pgs.

*Primary Examiner* — Melanie Torres Williams
(74) *Attorney, Agent, or Firm* — Merchant & Gould P.C.

(57) ABSTRACT

A method for detecting the speed of a bicycle, where the bicycle is equipped with an ABS system on the front wheel, in which, if the rear wheel deceleration is less than a preset threshold value, then the speed of the bicycle is identified with the rear wheel speed. If the front brake circuit pressure is below a preset low pressure threshold, then the speed of the bicycle is identified with the front wheel speed. Otherwise the speed of the bicycle is an estimated speed based on the last known speed and likely deceleration.

13 Claims, 6 Drawing Sheets

(51) Int. Cl.
*B60T 8/172* (2006.01)
*B62J 45/412* (2020.01)
*B62J 45/423* (2020.01)

(52) U.S. Cl.
CPC ......... *B62J 45/423* (2020.02); *B60T 2250/04* (2013.01)

(56) References Cited

U.S. PATENT DOCUMENTS

2018/0170472 A1 6/2018 Corno
2019/0233048 A1 8/2019 Takayama

* cited by examiner

| Transition Number | Logical condition required to enable transition |
|---|---|
| 1 | (Brake caliper pressure > High Caliper Pressure Threshold) AND (Front Wheel Speed – Rear Wheel Speed > High Delta Wheel Speed Threshold) |
| 2 | Brake caliper pressure < Low Caliper Pressure Threshold |
| 3 | Brake caliper pressure > High Caliper Pressure Threshold |
| 4 | Estimated Speed – Rear Wheel Speed < Low Delta Wheel Speed Threshold |
| 5 | (Brake caliper pressure < Low Caliper Pressure Threshold) AND (Front Wheel Speed – Rear Wheel Speed > High Delta Wheel Speed Threshold) |
| 6 | Front Wheel Speed – Rear Wheel Speed < Low Delta Wheel Speed Threshold |

FIG.5

METHOD AND SYSTEM FOR DETECTING THE SPEED OF A BICYCLE

This application is a National Stage Application of PCT/EP2021/086410, filed Dec. 17, 2021, which claims benefit of priority to Application No. 10 2020 000031865, filed Dec. 22, 2020 in Italy, and which applications are incorporated herein by reference. To the extent appropriate, a claim of priority is made to each of the above-disclosed applications.

FIELD OF TECHNOLOGY

The present disclosure relates to the field of the electric bicycles, and, more specifically, to a method and system for detecting the speed of a bicycle equipped with an ABS system on the front wheel. In particular, the object of the invention is a bicycle motion observer, which is a part of the control system used within a ABS system.

BACKGROUND

The aim of this software-based component is to compute the real time vehicle speed, regardless of whether the individual measured wheel speeds are reliable (for instance when one or other of the road wheels is locked or skidding). In this way continuous control of the ABS system is possible, even during dangerous situations.

As it is well known, when a rider applies the brake on a bicycle fitted with an ABS system, it is necessary to understand whether the controlled wheel is locked or not. It is possible to do this only by comparing the speed of the braked wheel against the speed of the vehicle.

However, if one or other or both of the bicycle wheels are locked or slipping, it is requested to make the best estimate of the vehicle speed from the available data. For example, in a bicycle fitted with an ABS system on the front wheel, the following data may be available: front wheel speed (from a rotating speed sensor on the front wheel), rear wheel speed (from a rotating speed sensor on the rear wheel), front brake circuit pressure (from a pressure transducer in the front brake hydraulic circuit).

Under normal circumstances with no braking, it can be assumed that the rear-wheel speed is the most reliable source of data for the vehicle speed. However, if the bicycle deceleration is significant, we need to consider that one or other or both wheel speeds may not be reliable. If the bicycle is decelerating strongly, but there is no pressure in the front braking circuit, it can be assumed that the rear brake is operating and that there is a risk that the rear wheel may skid or lock. Therefore, we should consider the front wheel speed as the most reliable source of vehicle speed data. Conversely, if the vehicle is decelerating and the front braking circuit is pressurized, there is a risk of the front wheel slipping or locking. Unfortunately, it can't be assumed that the rear wheel speed is reliable because no measure of pressure in the rear brake circuit is available.

Therefore, an object of the present invention is to estimate the speed of a bicycle under these circumstances and in an effective, reliable and simple way.

Such object is achieved by a method for detecting the speed of a bicycle and by a system for detecting the speed of a bicycle.

SUMMARY

According to a general embodiment of the invention, the method detects the speed of a bicycle equipped with an ABS system on the front wheel. The method comprises the steps of:

obtaining, from a first rotating speed sensor on the front wheel, the front wheel speed;

obtaining, from a second rotating speed sensor on the rear wheel, the rear wheel speed;

obtaining, from a pressure transducer in the front brake hydraulic circuit, the front brake circuit pressure;

calculating the rear wheel deceleration.

If the rear wheel deceleration is less than a preset threshold value, then the speed of the bicycle is identified with the rear wheel speed.

If the rear wheel deceleration is greater than the preset threshold value, the method includes the following further steps.

If the front brake circuit pressure is below a preset low pressure threshold, than then the speed of the bicycle is identified with the front wheel speed.

If the front brake circuit pressure is greater than the preset low pressure threshold, the speed of the bicycle is an estimated speed calculated according to the following sub-steps:

the front wheel speed is stored in a memory buffer;

when the memory buffer is filled, the front wheel mean speed and the front wheel deceleration are calculated;

if the front wheel deceleration value is within a preset deceleration threshold, the speed of the bicycle is estimated as the last calculated front wheel mean speed value, and the front wheel mean speed and front wheel deceleration values are stored;

if the front wheel deceleration value exceeds the preset deceleration threshold, the speed of the bicycle is estimated as the difference between the stored front wheel mean speed value and the stored front wheel deceleration value multiplied by the elapsed time since the front wheel mean speed and front wheel deceleration values were stored.

According to one aspect of the invention, at least some method steps are implemented by a finite state machine having a first state, in which the speed of the bicycle is the rear wheel speed, a second state, in which the speed of the bicycle is the estimated speed, and a third state, in which the speed of the bicycle is the front wheel speed. In this finite state machine:

a transition from the first state to the second state occurs when the front brake circuit pressure is greater than a high pressure threshold and the difference between the front wheel speed and the rear wheel speed is greater than a preset high delta wheel speed threshold;

a transition from the second state to the third state occurs when the front brake circuit pressure is less than a preset low pressure threshold;

a transition from the third state to the second state occurs when the front brake circuit pressure is greater that the preset high pressure threshold;

a transition from the second state to the first state occurs when the difference between the estimated speed and the rear wheel speed is less than a preset low delta wheel speed threshold;

a transition from the first state to the third state occurs when the front brake circuit pressure is less than the preset low pressure threshold and the difference between the front wheel speed and the rear wheel speed is greater that the preset high delta wheel speed threshold;

a transition from the third state to the first state occurs when the difference between the front wheel speed and the rear wheel speed is less than the preset low delta wheel speed threshold.

In one embodiment, the high pressure threshold is a pressure threshold value above which the front wheel can be considered to be slipping or locking.

In one embodiment, the low pressure threshold is a pressure threshold value below which the front wheel can be considered to be turning freely.

In one embodiment, the high delta wheel speed threshold is a delta wheel speed threshold above which one of the wheels is considered to be slipping.

In one embodiment, the low delta wheel speed threshold is a delta wheel speed threshold below which both wheels are considered to be turning at the same speed.

According to a further aspect of the invention, if the detected speed of the bicycle changes from an old value, corresponding to one among the front wheel speed, the rear wheel speed and the estimated speed, to a different new value, corresponding to a different one among the front wheel speed, the rear wheel speed and the estimated speed, a transition detection time interval is provided during which the speed of the bicycle is calculated as gradually changing from the old value to the new value.

In one embodiment, when the detected speed of the bicycle changes from the old value to the new value, the last detected value is stored and a transitional speed value is calculated as $$\text{transitional speed value} = \text{new value} - (\text{stored value}/(\text{Elapsed Time})^n),$$

where Elapsed Time is the time period since the change from the old value, and wherein n<1.

A system for detecting the speed of a bicycle equipped with an ABS system on the front wheel is also disclosed. According to a general embodiment, the system comprises:

a first rotating speed sensor suitable for detecting the front wheel speed;

a second rotating speed sensor suitable for detecting the rear wheel speed;

a pressure transducer suitable for detecting the front brake circuit pressure in the front brake hydraulic circuit;

an electronic control unit operatively coupled to the first rotating speed sensor, second rotating speed sensor and pressure transducer.

The electronic control unit is configured for implementing the method for detecting the speed of a bicycle disclosed above.

According to one aspect of the invention, the electronic control unit comprises a speed estimator module operatively coupled to the first rotating speed sensor and to a memory buffer and configured to estimate the speed of the bicycle according to the following instructions:

loading the front wheel speed in the memory buffer;

when the memory buffer is filled, calculating the front wheel mean speed and the front wheel deceleration;

if the front wheel deceleration value is within a preset deceleration threshold, estimating the speed of the bicycle as the last calculated front wheel mean speed value, storing in the memory buffer the front wheel mean speed and front wheel deceleration values;

if the front wheel deceleration value exceeds the preset deceleration threshold, estimating the speed of the bicycle as the difference between the stored front wheel mean speed value and the stored front wheel deceleration value multiplied by the elapsed time since the front wheel mean speed and front wheel deceleration values were stored.

According to one embodiment, the electronic control unit comprises a speed selection state machine module operatively coupled to the first rotating speed sensor, the second rotating speed sensor, the pressure transducer, the speed estimator module. The speed selection state machine module is configured for implementing the speed selection state machine disclosed above.

According to one embodiment, the electronic control unit further comprises a speed selection switch module operatively coupled to the first rotating speed sensor, the second rotating speed sensor and the speed estimator module. The speed selection switch module is configured to selectively outputs one of the outputs from the first rotating speed sensor, the second rotating speed sensor and the speed estimator module according to a control signal received from the speed selection state machine module.

According to one aspect of the invention, the electronic control unit further comprises a discontinuity correction module which, when the detected speed of the bicycle changes from an old value, corresponding to one among the front wheel speed, the rear wheel speed and the estimated speed, to a different new value, corresponding to a different one among the front wheel speed, the rear wheel speed and the estimated speed, is configured to store the last detected speed value and to calculate a transitional speed value as $$\text{transitional speed value} = \text{new value} - (\text{stored value}/(\text{Elapsed Time})^n),$$

where Elapsed Time is the time period since the change from the old value, and wherein n<1.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 5 is a table showing the logical conditions to be satisfied to enable each state transition in the finite state machine according to the invention;

A detailed description of preferred embodiments of the invention will be disclosed herein below with reference to the appended drawings.

DETAILED DESCRIPTION

Exemplary aspects are described herein in the context of a system and a method for detecting the speed of a bicycle equipped with an ABS system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings.

Figure 1:
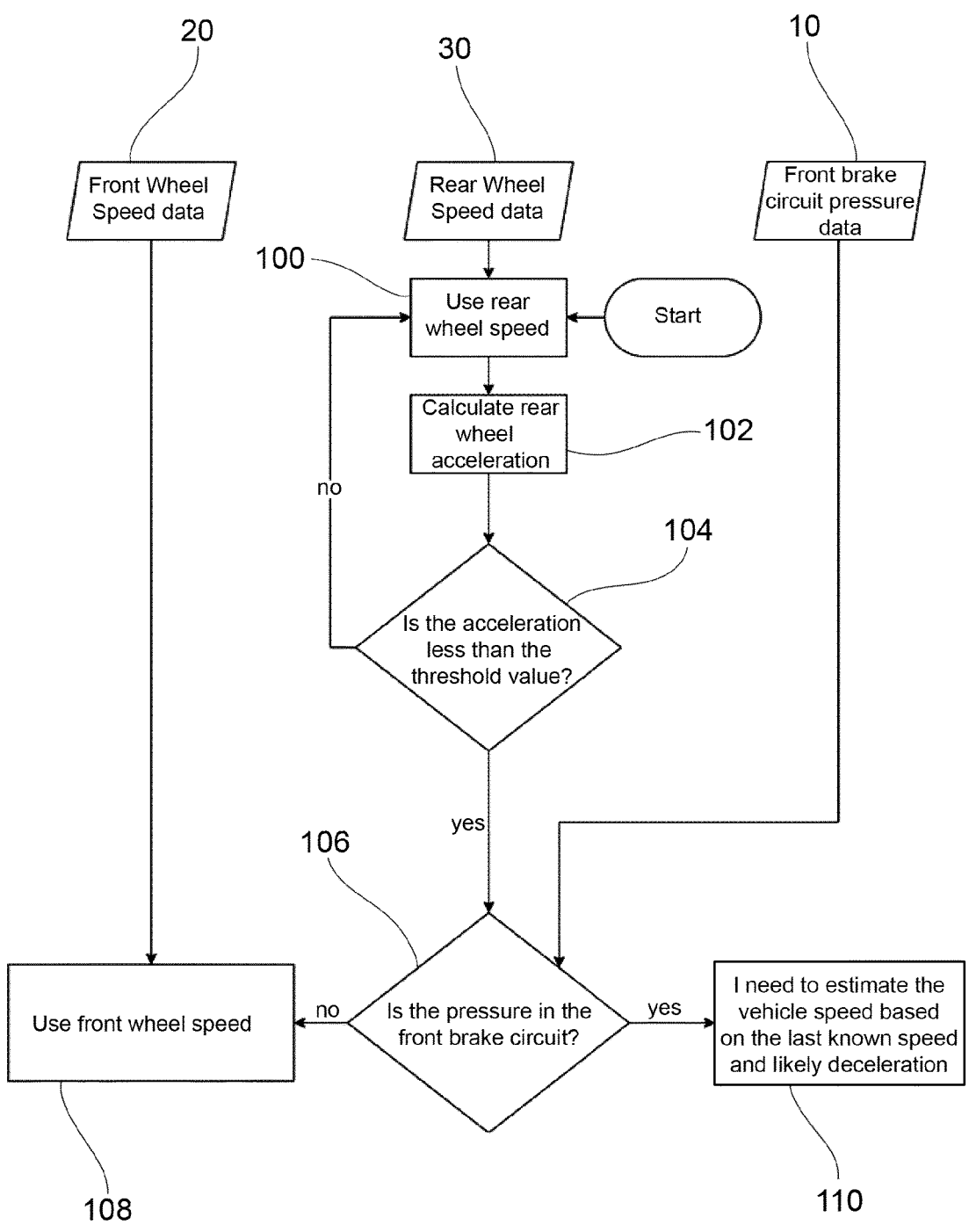
FIG. 1 is a flow-chart of the method for detecting the speed of the bicycle according to a general embodiment of the invention.

FIG. 1 discloses a general embodiment of a method for detecting the speed of the bicycle.

The method may be implemented by a real-time computational model, which estimates the vehicle speed taking as inputs:

Hydraulic pressure data 10 measured in front brake caliper circuit;

Front wheel speed data 20;

Rear wheel speed data 30.

The pressure data can be obtained from a pressure transducer 12 in the front brake hydraulic circuit.

The front wheel speed data 20 can be obtained from a first rotating speed sensor 22 on the front wheel.

The rear wheel speed data 30 can be obtained from a second rotating speed sensor 32 on the rear wheel.

As a starting point (100), the speed of the bicycle corresponds to the rear wheel speed.

In step 102, the rear wheel deceleration is calculated.

In step 104, the rear wheel deceleration is compared to a preset threshold value.

If the rear wheel deceleration is less than the preset threshold value, then the speed of the bicycle is identified with the rear wheel speed.

If the rear wheel deceleration is greater than the preset threshold value, in step 106 it is checked whether there is pressure in the front brake circuit.

If the front brake circuit pressure is below a preset low pressure threshold, than then the speed of the bicycle is identified with the front wheel speed (step 108).

If the front brake circuit pressure is greater than the preset low pressure threshold, the speed of the bicycle is an estimated speed (step 110), calculated according to an algorithm described herein below with reference to FIG. 2.

Figure 2:
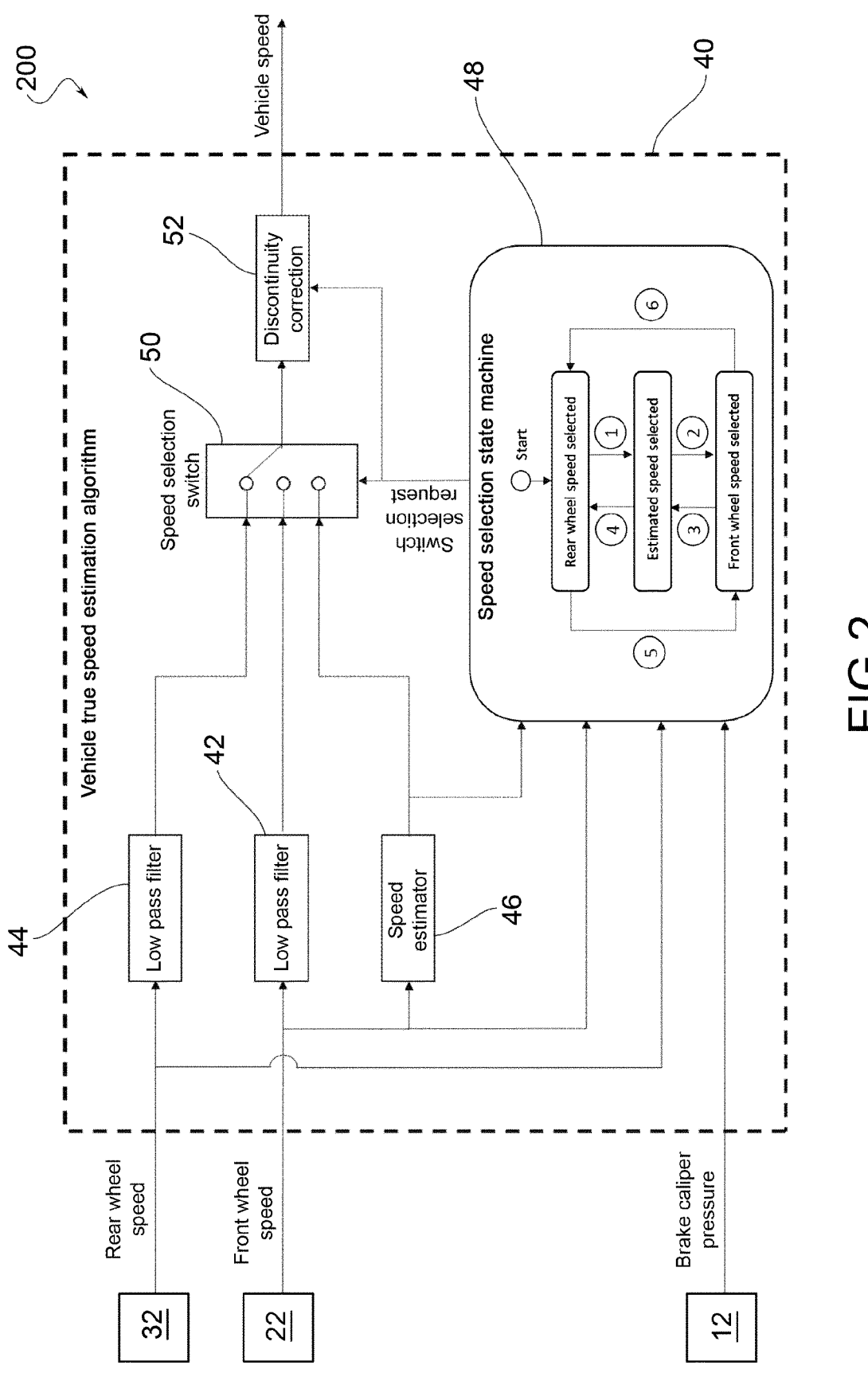
FIG. 2 is a diagram representing the system for detecting the speed of the bicycle.

FIG. 2 discloses a block diagram of a system 200 for detecting the speed of a bicycle, according to an exemplary embodiment of the invention.

The system 200 comprises a first rotating speed sensor 22 suitable for detecting the front wheel speed, a second rotating speed sensor 32 suitable for detecting the rear wheel speed, a pressure transducer 12 suitable for detecting the front brake circuit pressure in the front brake hydraulic circuit, an electronic control unit 40 operatively coupled to the first rotating speed sensor 22, second rotating speed sensor 32 and pressure transducer 12.

The electronic control unit 40 disclosed in FIG. 2 includes low pass filters 42, 44, a speed estimator module 46, a speed selection state machine module 48, a speed selection switch 50 and a discontinuity correction module 52.

These components of the electronic control unit 40 will be now described in detail.

The low pass filters 42, 44 are computational blocks that filter the raw speed data, in order to avoid spikes on signals that can cause computational errors. These functions are designed in order to introduce as short a time delay as possible, so as not to compromise the responsiveness of the ABS control system. Multiple filter technologies are available which could be used for this purpose. For example, moving average filters can be implemented.

The Speed Estimator module 46 consists of a computational block that estimates the vehicle speed. In some examples, it is always performing its calculation, even when the result of the speed estimator is not being diverted to the ABS control system through the speed selection switch module 50.

The computation takes as its input the measured front wheel speed measurement and loads the speed data points into a memory buffer. When the memory buffer is filled, the algorithm calculates the mean of all of the values (wheel mean speed) and also the difference between the highest and lowest values in the buffer (which, when divided by the time duration which is taken to fill the buffer, gives wheel deceleration).

If the deceleration value is within a certain threshold, the speed estimator modules outputs the last calculated wheel mean speed value, and the wheel mean speed and deceleration values are committed to memory.

If the deceleration value exceeds the threshold, the output of the module equates to the previous memorized wheel mean speed value, minus the previously memorized wheel deceleration value multiplied by the elapsed time since those values were stored.

Figure 3:
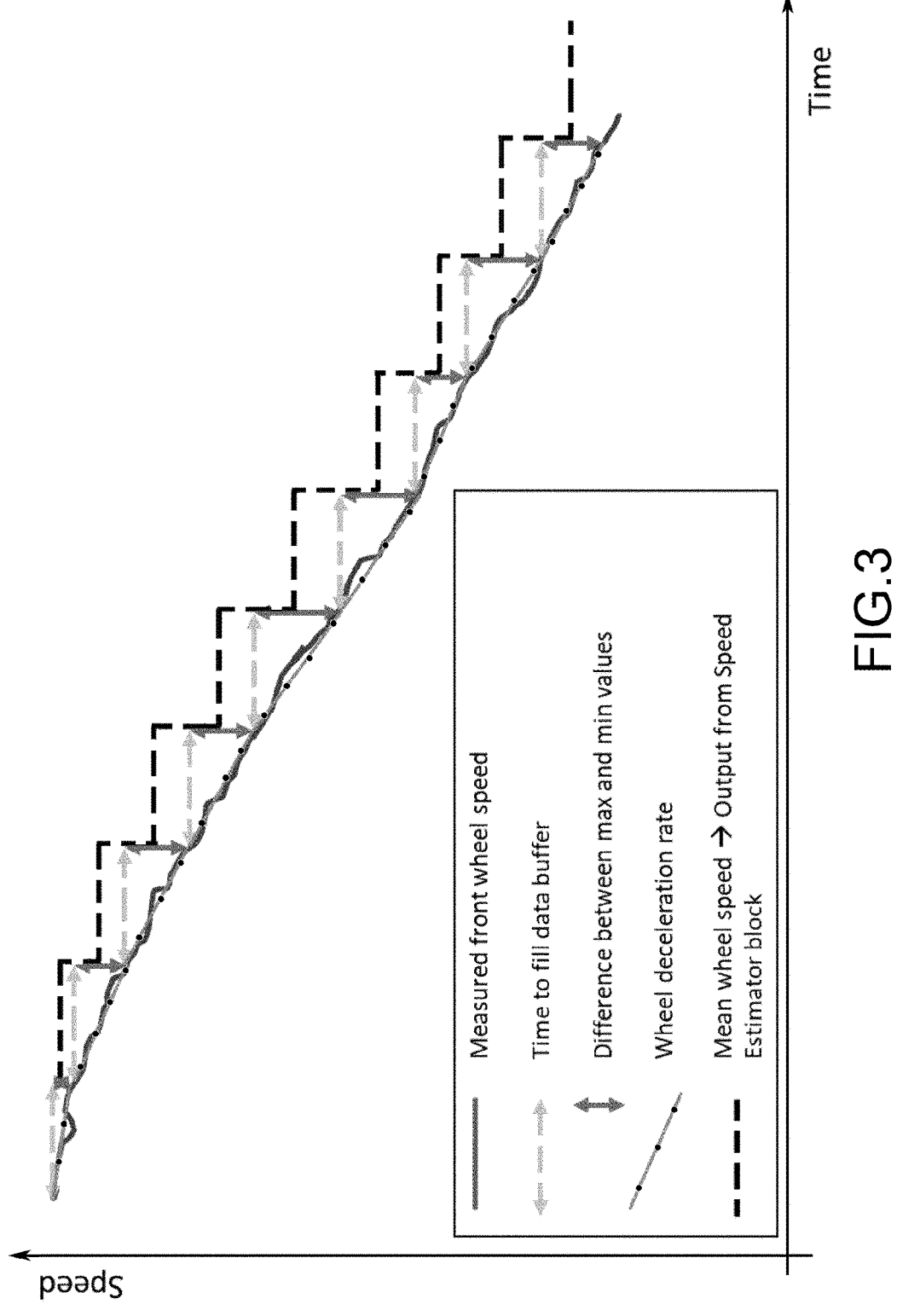
FIG. 3 is a time-speed diagram showing the behavior of the speed estimator module, when the front wheel decelerator remains within a predetermined threshold.

Therefore, the behavior of the speed estimator module may be summarized as follows:

If the wheel deceleration is within a predetermined limit, it can be assumed that the wheel is not locked or skidding. The output of the module equates to the mean wheel speed. This is illustrated diagrammatically in FIG. 3.

Figure 4:
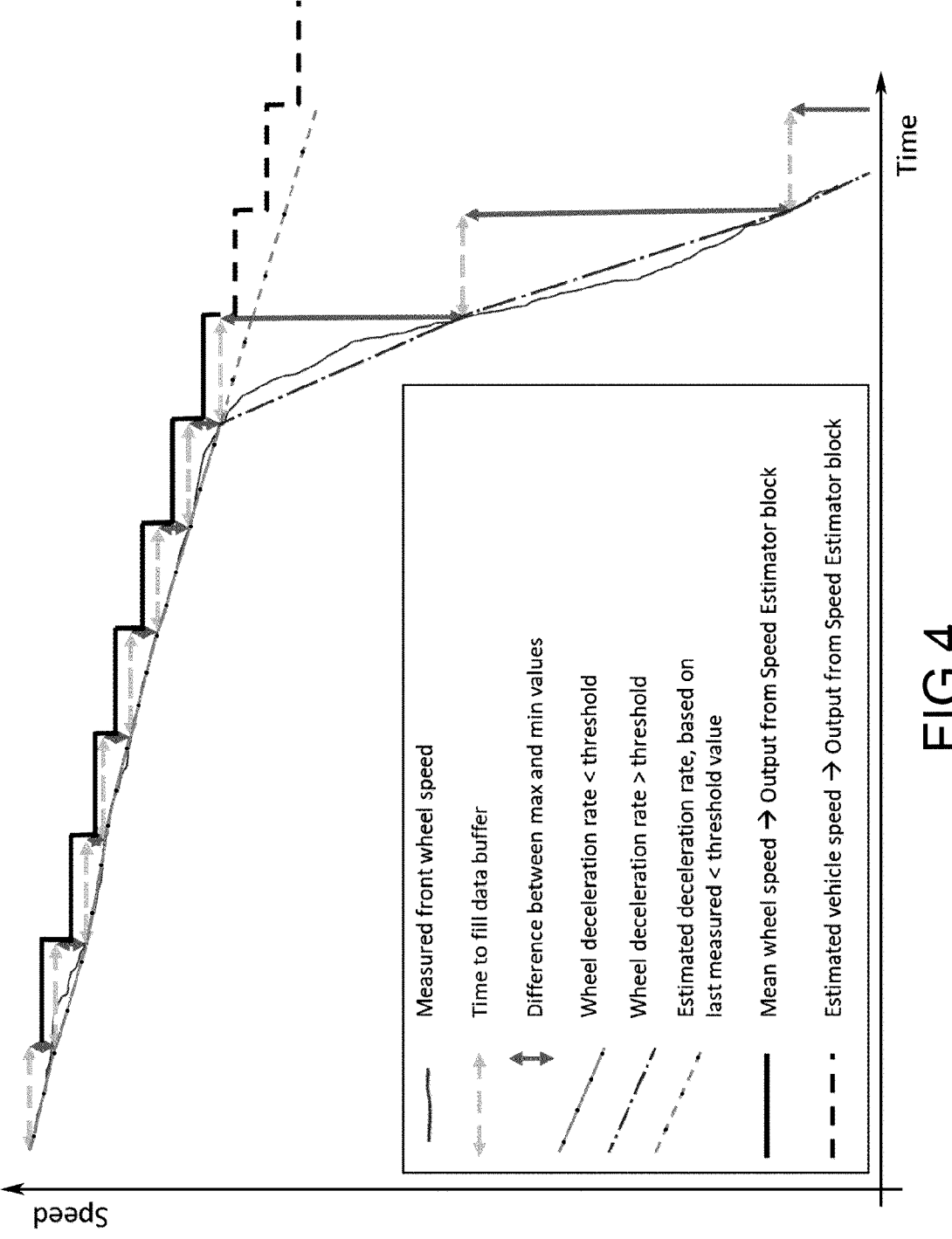
FIG. 4 is a time-speed diagram showing the behavior of the speed estimator module, when the front wheel deceleration suddenly exceeds the predetermined threshold.

If the wheel deceleration exceeds the predetermined threshold, it can be assumed that the wheel has suddenly changed in speed due to locking or skidding. The output of the module is calculated, assuming that the vehicle continues to decelerate at the same rate as before the locking or skidding occurred. This is illustrated diagrammatically in FIG. 4.

The state machine module 48 conducts the decision process used to select between the available vehicle speed sources based on the inputs:

Filtered front wheel speed

Filtered rear wheel speed

Estimated speed

Front brake pressure

Reference constants

The speed selection state machine has three states:

First state: rear wheel speed selected. The output of the speed selection state machine module 48 indicates to the speed selection switch module 50 that it should select rear wheel speed.

Second state: estimated speed selected. The output of the speed selection state machine module 48 indicates to the speed selection switch module 50 that it should select estimated speed.

Third state: front wheel speed selected. The output of the speed selection state machine module 48 indicates to the speed selection switch module 50 that it should select front wheel speed.

The logical flow between the states is controlled by a series of transitions, which are denoted by numbered arrows in FIG. 2. The transitions occur when each logical statement becomes true.

To that end, a list of fixed parameter values must be programmed into the system during the calibration stages of ABS system development. These parameters are:

High Caliper Pressure Threshold: a pressure threshold value above which the front wheel may be in danger of slipping or locking.

Low Caliper Pressure Threshold: a pressure threshold value below which the front wheel may be considered to be turning freely.

High Delta Wheel Speed Threshold: a delta wheel speed threshold above which one of the wheels is considered to be slipping.

Low Delta Wheel Speed Threshold: a delta wheel speed threshold below which both wheels are considered to be turning at the same speed.

The logical conditions which must be satisfied to enable each transition to occur are then as follows (the transition numbers refer to the annotation on FIG. 2). These logical conditions are described in the Table of FIG. 5.

A transition (1) from the first state to the second state occurs when the front brake circuit pressure is greater than the High Caliper Pressure Threshold and the difference between the front wheel speed and the rear wheel speed is greater than the High Delta Wheel Speed Threshold;

a transition (2) from the second state to the third state occurs when the front brake circuit pressure is less than the Low Caliper Pressure Threshold;

a transition (3) from the third state to the second state occurs when the front brake circuit pressure is greater that the High Caliper Pressure Threshold;

a transition (4) from the second state to the first state occurs when the difference between the estimated speed and the rear wheel speed is less than the Low Delta Wheel Speed Threshold;

a transition (5) from the first state to the third state occurs when the front brake circuit pressure is less than the Low Caliper Pressure Threshold and the difference between the front wheel speed and the rear wheel speed is greater that the High Delta Wheel Speed Threshold;

a transition (6) from the third state to the first state occurs when the difference between the front wheel speed and the rear wheel speed is less than the Low Delta Wheel Speed Threshold.

The speed selection switch module 50 is operatively connected, at its input, to the output of the low pass filter 44 of the rear wheel speed data, to the output of the low pass filter 42 of the front wheel speed data, and to the output of the speed estimator module 46. The speed selection switch module 50 has a control input for receiving a switch selection request signal from the speed selection state machine module 48.

Depending on the output from the state machine module 48, the correct speed value is passed to the output of the vehicle motion observer system 200.

The discontinuity correction module 52 is operatively connected to the output of the speed selection switch module 50 and to the output of the speed selection state machine 48. Therefore, the switch selection request signal is also received by the discontinuity correction module 52.

The function of the discontinuity correction module 52 is avoiding sudden discontinuities in speed value when the speed selection switch changes between input sources.

When the discontinuity detection module 52 detects that the switch selection request from the state machine changes in value, the last detected value from the speed selection switch module is stored in a memory.

During subsequent calculation steps, the following output value is calculated:

$$\text{Output value}=\text{New speed data}-(\text{stored data}/(\text{Elapsed Time})^n)$$

where Elapsed time is the time period since the switch selection request changed, and $n<1$.

Figure 6:
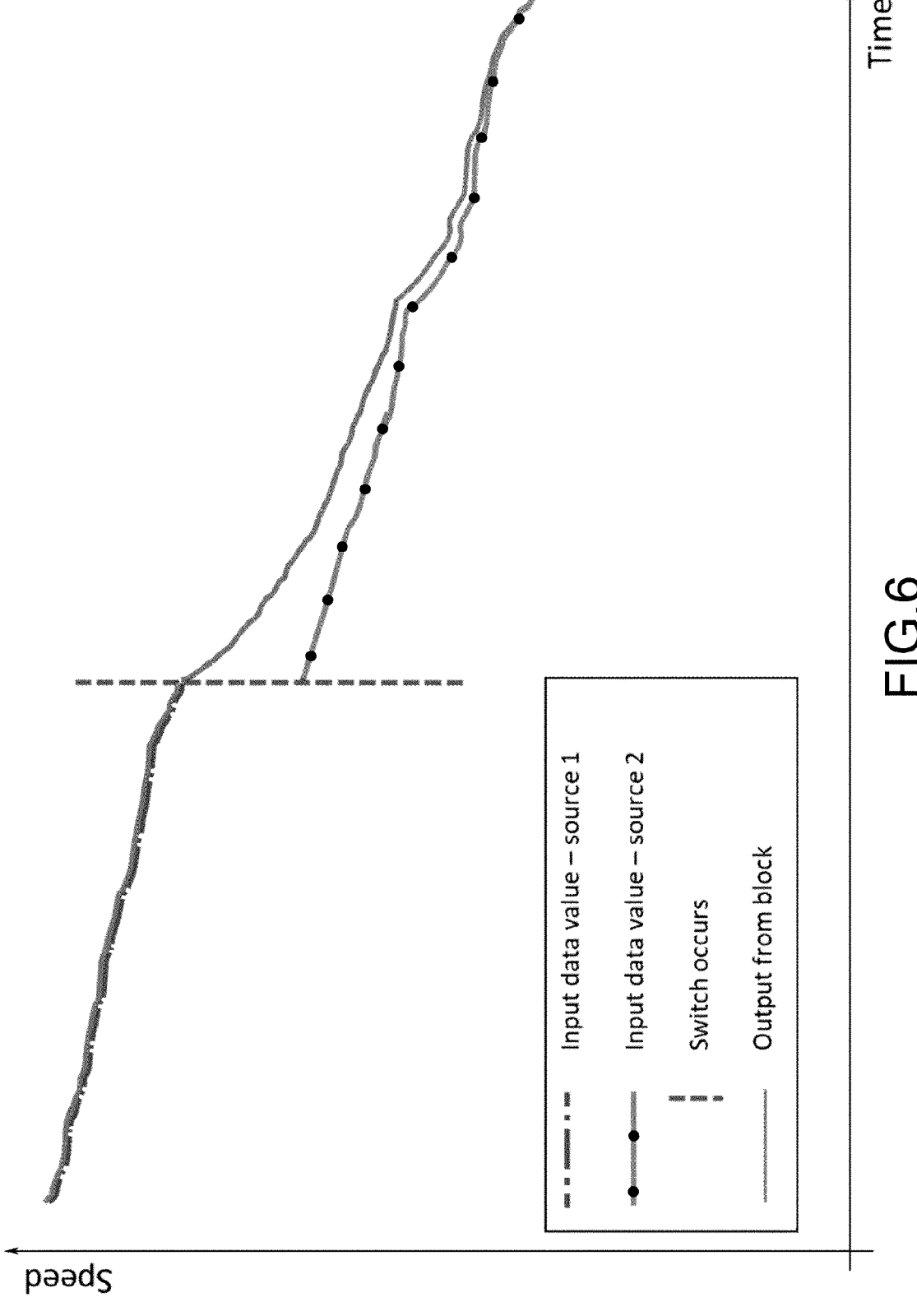
FIG. 6 is a time-speed diagram showing the behavior of the discontinuity correction module.

The behavior of this module is such that, if a discontinuity occurs between the selected data sources, the output data is smoothed after a switch occurs, the output data tending towards the value from the new data source. The rate at which the tendency towards the new data source occurs depends on the value of the power n. The behavior of the discontinuity correction block is shown diagrammatically in FIG. 6.

From the description above, it can be appreciated that the estimated speed is computed mathematically and without using an inertial sensor. The estimated speed is used whenever both wheel speeds are not reliable (for example when the rear wheel speed is not known to be reliable and a pressure above a certain reference value is applied on the front brake caliper so that the front wheel may also be skidding).

Advantageously, it is possible to estimate vehicle speed without using an inertial sensor and obtain a final computed speed that comes from the most reliable derived from the inputs listed above.

The proposed calculation method potentially requires low computational power, allowing the entire algorithm to run in the background whilst at the same time giving accurate and reliable results.

It should be noted that the term "module" as used in the present disclosure refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

For example, the present disclosure have been made with reference to a bicycle; however, it is clear that the inventive concept can be extended to other kinds of vehicles, for example to other two wheelers with ABS on front wheels only (e.g. scooters or motorcycles), or other vehicles where ABS is applied via a single hydraulic circuit to the brakes on a single axle, and the mean speed of the wheels of another axle is also used as an input to the system.

Furthermore, for the sake of clarity, the present disclosure has been referred to a bicycle equipped with an ABS system on the front wheel, but it would be apparent to those skilled in the art having the benefit of this disclosure that the inventive concepts can be applied also to bicycles or other vehicles where the ABS system is mounted on rear wheel(s).

The invention claimed is:

1. A method for detecting speed of a bicycle, wherein the bicycle is equipped with an ABS system on a front wheel, the method comprising the steps of:
   a) obtaining, from a first rotating speed sensor on the front wheel, a front wheel speed;
   b) obtaining, from a second rotating speed sensor on a rear wheel, a rear wheel speed;
   c) obtaining, from a pressure transducer in a front brake hydraulic circuit, a front brake circuit pressure;
   d) calculating a rear wheel deceleration;
   e) if the rear wheel deceleration is less than a preset deceleration threshold value, then the speed of the bicycle is identified with the rear wheel speed, otherwise:
   f) if the front brake circuit pressure is below a preset low pressure threshold, then the speed of the bicycle is identified with the front wheel speed, otherwise
   g) the speed of the bicycle is an estimated speed calculated according to the following sub-steps:
      i) loading the front wheel speed in a memory buffer;
      ii) when the memory buffer is filled, calculating a front wheel mean speed and a front wheel deceleration;
      iii) if the front wheel deceleration value is within a preset deceleration threshold, the speed of the bicycle is estimated as a last calculated front wheel mean speed value, and the front wheel mean speed and front wheel deceleration values are stored;
      iv) if the front wheel deceleration value exceeds the preset deceleration threshold, the speed of the bicycle is estimated as a difference between the stored front wheel mean speed value and the stored front wheel deceleration value multiplied by an elapsed time since the front wheel mean speed and front wheel deceleration values were stored in sub-step iii).

2. The method of claim 1, wherein steps d), e), f) and g) are implemented by a finite state machine having a first state, in which the speed of the bicycle is the rear wheel speed, a second state, in which the speed of the bicycle is the estimated speed, and a third state, in which the speed of the bicycle is the front wheel speed, and wherein:
   a transition from the first state to the second state occurs when the front brake circuit pressure is greater than a preset high pressure threshold and a difference between the front wheel speed and the rear wheel speed is greater than a preset high delta wheel speed threshold;
   a transition from the second state to the third state occurs when the front brake circuit pressure is less than a preset low pressure threshold;
   a transition from the third state to the second state occurs when the front brake circuit pressure is greater that the preset high pressure threshold;
   a transition from the second state to the first state occurs when a difference between the estimated speed and the rear wheel speed is less than a preset low delta wheel speed threshold;
   a transition from the first state to the third state occurs when the front brake circuit pressure is less than the preset low pressure threshold and difference between the front wheel speed and the rear wheel speed is greater that the preset high delta wheel speed threshold;

a transition from the third state to the first state occurs when the difference between the front wheel speed and the rear wheel speed is less than the preset low delta wheel speed threshold.

3. The method according to claim 2, wherein the high pressure threshold is a pressure threshold value above which the front wheel is considered to be slipping or locking.

4. The method according to claim 2, wherein the low pressure threshold is a pressure threshold value below which the front wheel is considered to be turning freely.

5. The method according to claim 2, wherein the high delta wheel speed threshold is a delta wheel speed threshold above which one of the wheels is considered to be slipping.

6. The method according to claim 2, wherein the low delta wheel speed threshold is a delta wheel speed threshold below which both wheels are considered to be turning at a same speed.

7. The method according to claim 1, wherein, if the detected speed of the bicycle changes from an old value, corresponding to one among the front wheel speed, the rear wheel speed and the estimated speed, to a different new value, corresponding to a different one among the front wheel speed, the rear wheel speed and the estimated speed, a transition detection time interval is provided during which the speed of the bicycle is calculated as gradually changing from the old value to the new value.

8. The method according to claim 7, wherein, when the detected speed of the bicycle changes from the old value to the new value, the last detected value is stored and a transitional speed value is calculated as transitional speed value=new value-(stored value/(Elapsed Time)"), where Elapsed Time is the time period since the change from the old value, and wherein n<1.

9. A system for detecting a speed of a bicycle, where the bicycle is equipped with an ABS system on the front wheel, the system comprising:
   a first rotating speed sensor for detecting a front wheel speed;
   a second rotating speed sensor on a rear wheel for detecting a rear wheel speed;
   a pressure transducer for detecting a front brake circuit pressure in a front brake hydraulic circuit;
   an electronic control unit operatively coupled to said first rotating speed sensor, said second rotating speed sensor and said pressure transducer and configured for implementing a method for detecting the speed of a bicycle comprising:
   a) obtaining, from said first rotating speed sensor on said front wheel, the front wheel speed;
   b) obtaining, from said second rotating speed sensor on said rear wheel, the rear wheel speed;
   c) obtaining, from said pressure transducer in said front brake hydraulic circuit, the front brake circuit pressure;
   d) calculating a rear wheel deceleration;
   e) if the rear wheel deceleration is less than a preset deceleration threshold value, then the speed of the bicycle is identified with the rear wheel speed, otherwise:
   f) if the front brake circuit pressure is below a preset low pressure threshold, then the speed of the bicycle is identified with the front wheel speed, otherwise
   g) the speed of the bicycle is an estimated speed calculated according to the following sub-steps:
      i) loading the front wheel speed in a memory buffer;
      ii) when the memory buffer is filled, calculating a front wheel mean speed and a front wheel deceleration;

iii) if the front wheel deceleration value is within a preset deceleration threshold, the speed of the bicycle is estimated as a last calculated front wheel mean speed value, and the front wheel mean speed and front wheel deceleration values are stored;

iv) if the front wheel deceleration value exceeds the preset deceleration threshold, the speed of the bicycle is estimated as a difference between the stored front wheel mean speed value and the stored front wheel deceleration value multiplied by an elapsed time since the front wheel mean speed and front wheel deceleration values were stored in sub-step iii).

10. The system according to claim 9, wherein the electronic control unit comprises a speed estimator module operatively coupled to the first rotating speed sensor and to the memory buffer and configured to:

load the front wheel speed in the memory buffer, when the memory buffer is filled, calculate the front wheel mean speed and the front wheel deceleration;

if the front wheel deceleration value is within a preset deceleration threshold, estimate the speed of the bicycle as the last calculated front wheel mean speed value, store in the memory buffer the front wheel mean speed and front wheel deceleration values;

if the front wheel deceleration value exceeds the preset deceleration threshold, estimate the speed of the bicycle as the difference between the stored front wheel mean speed value and the stored front wheel deceleration value multiplied by the elapsed time since the front wheel mean speed and front wheel deceleration values were stored.

11. The system according to claim 10, wherein the electronic control unit comprises a speed selection state machine module operatively coupled to the first rotating speed sensor, the second rotating speed sensor, the pressure transducer, the speed estimator module and configured for implementing a speed selection state machine.

12. The system according to claim 11, wherein the electronic control unit further comprises a speed selection switch module operatively coupled to the first rotating speed sensor, the second rotating speed sensor and the speed estimator module, and configured to select one or more outputs from the first rotating speed sensor, the second rotating speed sensor and the speed estimator module according to a control signal received from the speed selection state machine module.

13. The system claim 9, wherein the electronic control unit further comprises a discontinuity correction module which, when the detected speed of the bicycle changes from an old value, corresponding to one among the front wheel speed, the rear wheel speed and the estimated speed, to a different new value, corresponding to a different one among the front wheel speed, the rear wheel speed and the estimated speed, is configured to store the last detected speed value and to calculate a transitional speed value as transitional speed value=new value-(stored value/(Elapsed Time)"), where Elapsed Time is a time period since the change from the old value, and wherein n<1.

* * * * *